US00RE41686E

(19) United States
(12) Reissued Patent
Fujita et al.

(10) Patent Number: US RE41,686 E
(45) Date of Reissued Patent: Sep. 14, 2010

(54) ELECTRONIC WATCH

(75) Inventors: Kenji Fujita, Tokyo (JP); Isamu Kobayashi, Tokyo (JP); Kiyotaka Igarashi, Tokyo (JP); Akiyoshi Murakami, Tokyo (JP)

(73) Assignee: Citizen Holdings Co., Ltd., Tokyo (JP)

(21) Appl. No.: 09/659,042

(22) Filed: Sep. 7, 2000

Related U.S. Patent Documents

Reissue of:
(64) Patent No.: 5,889,736
Issued: Mar. 30, 1999
Appl. No.: 08/721,614
Filed: Sep. 26, 1996

(30) Foreign Application Priority Data

Sep. 26, 1995 (JP) ..... 247209/1995
Sep. 26, 1995 (JP) ..... 247210/1995

(51) Int. Cl.
*G04B 9/00* (2006.01)
*G04B 19/04* (2006.01)
*G04C 23/00* (2006.01)

(52) U.S. Cl. ..... 368/66; 368/80; 368/204
(58) Field of Classification Search ..... 368/64, 368/66, 80, 82, 203–205
See application file for complete search history.

(56) References Cited

U.S. PATENT DOCUMENTS 4,003,198 A * 1/1977 Morokawa ..... 368/10
4,041,691 A * 8/1977 Chihara et al.
4,144,704 A * 3/1979 Portmann
4,259,737 A * 3/1981 Berney ..... 368/66
4,316,274 A * 2/1982 Ushikoshi ..... 368/66
4,398,832 A * 8/1983 Maire et al. ..... 368/76
4,690,568 A * 9/1987 Odagiri et al. ..... 368/204
4,702,613 A * 10/1987 Ohtawa ..... 368/66
4,714,352 A * 12/1987 Ganter ..... 368/64
4,785,436 A 11/1988 Sase
5,446,702 A * 8/1995 Mossuz et al. ..... 368/37

FOREIGN PATENT DOCUMENTS

| | | | |
|---|---|---|---|
| EP | 0 591 557 | A1 | 4/1994 |
| EP | 0 766 150 | A1 | 4/1997 |
| JP | 51-121368 | | 10/1976 |
| JP | 61-176878 | | 8/1986 |
| JP | 61-202186 | | 9/1986 |
| JP | 61-280595 | | 12/1986 |
| JP | 62-16492 | | 1/1987 |
| JP | 62-46390 | | 3/1987 |
| JP | 62-194484 | A | 8/1987 |
| JP | 62-194484 | | 8/1987 |
| JP | 63-88790 | | 6/1988 |
| JP | 68 148193 | A | 6/1988 |
| JP | 63-223588 | | 9/1988 |
| JP | 03-269281 | | 11/1991 |
| JP | 4-78594 | | 7/1992 |
| JP | 05-264751 | | 10/1993 |
| JP | 7-46145 | | 2/1995 |
| WO | WO 93/22712 | | 11/1993 |

* cited by examiner

*Primary Examiner*—Vit W Miska
(74) *Attorney, Agent, or Firm*—Scully, Scott, Murphy & Presser, P.C.

(57) ABSTRACT

In an electronic watch having an electrical generation means, an electrical power storage means which stores electrical energy generated by the electrical generation means, an oscillator circuit, a control section which operates in response to a clock of the oscillator circuit, and a display section which is controlled by the control section, and which displays the time and also selectively displays a function other than the time, a voltage detection means which detects the voltage of the electrical power storage means and a control section management means which, in response to a detection signal from the voltage detection means controls the operation of the control section are provided, and hysteresis is provided between the operation starting point and operation ending point of the control section, which control such operations as storage of hand positions.

12 Claims, 5 Drawing Sheets

TRANSION CONDITION

ELECTRONIC WATCH

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an electronic watch, and more specifically it relates to an electronic watch having an internal electrical generating mechanism, and in particular an electronic watch which also has a chronograph function.

2. Description of the Related Art

In the past multifunction electronic watches having not only a time function, but also a such functions as a chronograph function and alarm function have been developed and manufactured. These multifunction electronic watches differ, depending upon watch functions are added to the time function, and for this reason an internal microcomputer has been used, enabling a change in the specifications for various different products.

In a multifunction watch such as this, because it is necessary to have a single hand indicate a variety of elements, for example, the current time and the alarm time, a hand position counter is caused to coincide with, for example, a current time counter, so as to achieve an indication by means of the hand.

For this reason, it was necessary to first perform the operation of causing the hand position to coincide with the hand position counter, this being known as the reference position adjustment operation.

This reference position adjustment operation needed to be performed each time the internal circuit took on an indeterminate state because of, for example, battery replacement, and was extremely troublesome.

As a method of solving this problem, an electronic watch was disclosed by the applicant in Japanese Patent Application No. 5-517803, in which, when a decrease in the battery voltage is detected, the contents of a hand position counter are saved in a non-volatile memory, these contents being transformed to the hand position counter after battery replacement, thereby eliminating the need for hand setting.

In the past an electronic watch has been developed and manufactured which has an electrical generating mechanism such as a solar cell and an electric power storage means such as an electric two layered condenser or a secondary cell, thereby eliminating the need for battery replacement. These watches, not requiring battery replacement, were extremely convenient.

A supply in the form of the above-noted electrical power generation means such formed by an electrical generating means and electric power storage means exhibit a wide variation in voltage, and can sometimes exhibit a change in voltage similar to that encountered when a conventional battery is replaced.

Namely, the voltage thereof can be varied by crossing an operational limit voltage of the electric watch.

For this reason, when applying this power supply to a multifunction watch, the above-noted technique for hand position storage is extremely effective. If this technique is not provided, each time the power supply voltage falls below the operational limit voltage, it is necessary to perform a reference position adjustment.

However, even when the above-noted hand position storage technique is applied, if the power supply voltage varies in the region surrounding the operational limit voltage, it is necessary to repeatedly perform the hand position writing and hand position reading operations, thereby resulting not only in wasteful consumption of electrical power, but also in the possibility that the writing and reading operations will not be performed accurately.

In addition, in the above-noted electronic watch having an electrical generation mechanism, if the amount of charge of the electrical power storage means which is the electrical generation means as a power supply means, is insufficient, it was necessary to notify the user of this condition, as a prompt to perform charging.

As a means of solving this problem, in accordance with the disclosure in the Japanese Unexamined Patent Publication (KOKAI) No. 62-194484, by changing the type of movement of the second hand, notification is made of the insufficient charge, and if the voltage is restored after the watch has stopped, hand movement different that the above is performed, to notify the user that the watch had stopped, and that the displayed time has been disturbed. However, in the above-noted technology, because the second hand continues to be driven even when the voltage of the electrical power storage means has decreased, valuable electrical power is consumed, this resulting in an acceleration of the drop in the voltage of the secondary cell.

However, if the second hand is stopped, there is a danger that the user might be caused to misinterpret this as indicating that the watch has totally stopped, if the second hand is merely stopped, the value of the watch as a product will decrease.

SUMMARY OF THE INVENTION

An object of the present invention is to solves the problems presented by the above-noted in the prior art, by establishing a system that can be applied to a multifunction watch having a power supply comprising an electrical generation mechanism, and by providing an electronic watch which is capable of accurately notifying the user of the amount of charge in the electrical power storage means, without wastefully using electrical energy.

To achieve the above-noted object, the present invention uses basically the following technical constitution.

Specifically, in an electronic watch having a electrical generation means, an electrical power storage means which stores electrical energy generated by the above-noted electrical generation means, an oscillator circuit, a control section which operates in response to a clock of the above-noted oscillator circuit, and a display section which is controlled by the above-noted control section, and which displays the time and also selectively displays a function other than the time, a voltage detection means for detecting the voltage of the electrical power storage means and a control section management means for controlling the operation of the control section in response to a detection signal of the voltage detection means are provided, a first specific aspect of the above-noted electronic watch being an electronic watch configured as noted above, and further configured so that the above-noted control section management means exhibits hysteresis at the starting point of the operation of the control section and the ending point of the operation of the control section, and a second aspect of the above-noted electronic watch being an electronic watch configured as noted above, and further configured so that the above-noted control section management means operates the control section in response to a detection signal of the detection means, and stops at least one of a plurality of hands used in the time display at a pre-established position for the purpose of indicating the current voltage level of the above-noted electrical power storage means.

Because an electronic watch according to the present invention uses the technical constitution described above, in an electronic watch which is controlled by a microcomputer, when switching from the normal control state to the charge warning state, by providing hysteresis at the voltage value at which the operation changes, even in the case in which the voltage of the power supply, which is the electrical generation means, is derived from a secondary cell which exhibits instability, there being no excessively frequent change in conditions so that no useless disturbance is given to a user thereof, or even at the point at which a switch is made from the charge warning state to the stopped state, the provision of this hysteresis in the voltage value provides the advantage that unnecessary hand position storage operations are not performed, there being no excessively frequent changes in condition, the user not being confused, and the reset cancel operation not being performed with excessive frequency.

Additionally, because it is possible to indicate the charge condition of the electrical generation means or the electrical power storage means of the electronic watch by stopping a hand thereof at a particular position, it is possible to inform the user of the need for a charging operation without unnecessarily consuming electrical energy.

DETAILED DESCRIPTION OF THE INVENTION

An example of an electronic watch according to the present invention will be described in detail, with reference being made to the accompanying drawings.

Figure 1:
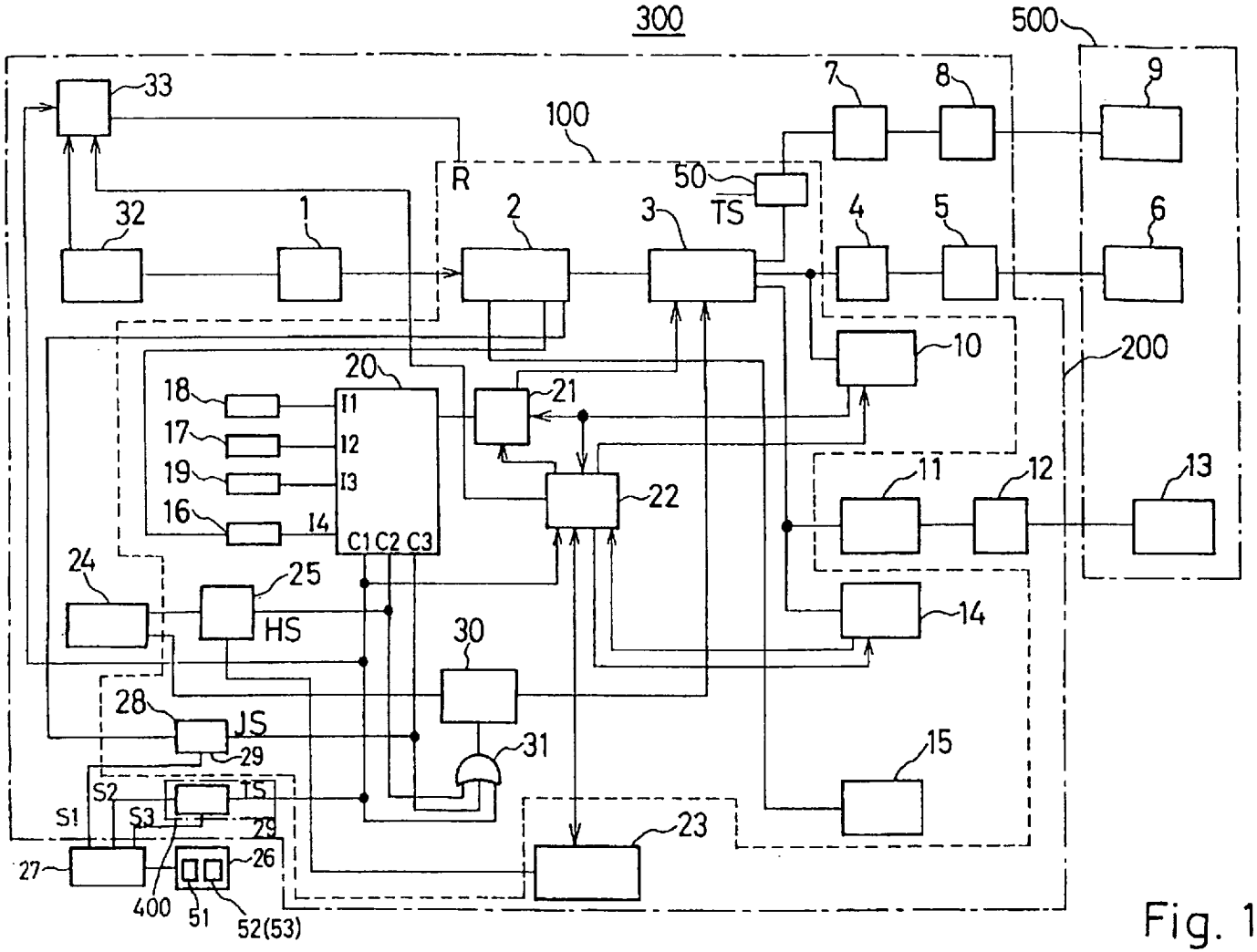
FIG. 1 is a circuit block diagram of a multifunction electronic watch having an electrical generation mechanism according to the present invention.

FIG. 1 is a simplified block diagram which shows an example of the configuration of an electronic watch 300 according to the present invention. In this drawing, the electronic watch 300 comprises an electrical generating means 26, an oscillator circuit 32, a control section 100 which operates in response to a clock of the oscillator circuit 32, and a display section 500 which displays the time and also selectively displays a function other than the time, the electronic watch 300 being provide with a voltage detection means 27 which detects the voltage of the electrical generation means 26 and a control section management means 400 which controls the operation of the control section 100 in response to a detection signal of the voltage detection means 27.

The oscillator circuit 32 which is used in the electronic watch 300 according to the present invention can be a quartz crystal oscillator circuit, for example, and the electrical generation means 26 which functions as the power supply for the present invention includes an electric power generator means 51 and an electrical power storage means 52/53 which stores the electrical energy generated by the electric power generator means 51.

The electric power generator means 51 which is used in the present invention is a power supply having characteristics such that its output voltage varied with the passage of time and it is particularly desirable that this be a battery with characteristics that exhibit an increase and a decrease in output voltage with the passage of time. Examples of this include a solar cell and a mechanical-type electrical generation means.

The electrical power storage means 52/53 used in the present invention can be a capacitor or the like, can also be an appropriate secondary cell, and can further be a combination of the both of these.

Therefore, the voltage detection means 27 of the present invention detects the output voltage of either the electrical power storage means 52 or 53.

The control section management means 400 of the present invention is configured so as to control the starting point and the ending point of operation of the above-noted control section 100, in response to a detection signal from the above-noted voltage detection means 27.

An example of the first aspect of an electronic watch 300 according to the present invention will now be described, with reference made to the related drawings.

An embodiment of present invention is described below. FIG. 1 is a circuit block diagram which shows an embodiment of the present invention.

In FIG. 1, the reference numeral 1 denotes an oscillator circuit, which outputs a 32768 Hz reference signal, using a quartz crystal (not shown in the drawing) as the oscillation source, and 2 is a frequency divider circuit, which frequency divides the reference signal from the oscillator circuit 1.

The reference numeral 3 denotes a waveform-shaping circuit, which outputs step pulses for the purpose of driving an hour/minute display means comprising an hour/minute hand 9 and a second display means comprising a second hand 6, these to be described later, and 4 is a second-motor drive circuit, which converts a step pulse from the waveform-shaping circuit 3 to a signal for motor driving.

The reference numeral 5 denotes a second motor, which rotates in response to a drive signal from the second-motor drive circuit 4. The reference numeral 6 is a second display means comprising a second hand, which performs step movement in accordance with the rotation of the second motor 5.

The reference numeral 7 denotes an hour/minute drive circuit, which converts a step pulse from the waveform-shaping circuit 3 to a signal for motor driving, 8 is a minute/hour motor which rotates in response to a drive signal from the minute/hour motor drive circuit 7, and 9 is a minute/hour display means comprising a minute/hour hand, which performs step movement in accordance with the rotation of the minute/hour motor 8.

In this same FIG. 1, the reference numeral 10 denotes a second-hand position counter, which is a base-60 counter that is linked to the second hand 6, 11 is a chronograph motor drive circuit which converts a 1/20-second signal from the waveform-shaping circuit 3 to a signal for driving a chronograph motor, 12 is a chronograph motor which rotates upon receiving a signal from the chronograph drive circuit, 13 is a chronograph display means comprising a chronograph hand which moves in steps in accordance with the chronograph motor 13 rotation, 14 is a chronograph position counter which is linked to the chronograph hand 13, 15 is a chronograph counter which counts the chronograph time.

In this embodiment, the display means 500 comprises the hour/minute display means 9, the second display means 6, and the chronograph display means 13.

In the same FIG. 1, reference numeral 16 denotes a second counter, which counts the current time, and 17 is a 21 counter, which is fixed at the value 21. Similarly, 18 is a 24 counter, and 19 is an 18 counter.

The reference numeral 20 denotes a selector means, which when a signal is input to any of the control terminals C1, C2, or C3, performs to output a signal output from any one of the input terminals I1, I2, I3 and I4, in response to the one of the control terminals C1, C2, or C3 to which the input signal is input. For example, when an input signal was input to the control terminals C1, the output signal is output form the input terminal I1.

Furthermore, if a plurality of control signals are input simultaneously, the one having the lowest number has priority. The reference numeral 21 denotes a coincidence detection circuit, which when it detects coincidence between the contents output from the selector means 20 and the contents of the second-hand position counter 10 outputs a detection signal to the waveform-shaping circuit 3, and 22 is a counter control means, which writes the counter information of the second-hand position counter 10 and chronograph position counter into non-volatile memory, to be described later, and read this information from the non-volatile memory.

At the point at which writing is completed, a writing completed signal is output, and at the point at which readout is completed, a readout completed signal is output. The reference numeral 23 denotes a non-volatile memory, into which are stored counter information of the second-hand position counter 10 and the chronograph hand position counter 14, under control of the counter control means 22.

That is, in the case in which C1 and C2 are input simultaneously, the signal I1, which corresponds to C1, will be output with higher priority, and if C2 and C3 are input simultaneously, the signal I2, which corresponds to C2, will be output with higher priority. If none of the signals C1 through C3 are input, I4 is output.

The reference numeral 24 is an input means, which comprises an external operating switch, 25 is a hand setting warning signal output means, which outputs a hand setting warning signal starting immediately after a reset signal from a microcomputer reset means 33 is canceled, the output of the hand setting warning signal being stopped by means of an operating signal of the switch means 24. The reference 26 numeral denotes an electrical generation means formed by, for an example, a solar cell and a storage cell, and 27 is a voltage detection means, which outputs a first detection signal S1 if the voltage from the electrical generation means 26 is 1.27 V or lower, a second detection signal S2 if the voltage from the electrical generation means 26 is 1.20 V or lower, and a third detection signal S3 if the voltage of from the electrical generation means is 1.15 V or lower.

Reference numeral 28 denotes a charge warning signal output means, which outputs a charge warning signal JS when it receives the signal S1 from the voltage detection means 27, the output of the signal JS being stopped 30 second after the signal S1 is canceled, and 29 is a stoppage warning signal output means, which outputs a stoppage warning signal TS when it receives the signal S3 from the voltage detection means 27, the output of the stoppage warning signal TS being stopped when the signal S2 is canceled.

The above-noted hand setting warning signal output means 25, charge warning signal output means 28, and stoppage warning signal output means 29 are configuration so as to output their respective signals immediately after operation starts.

The reference numeral 30 denotes a mode control means, which controls the switching of the mode of the electronic watch upon receiving a signal from the input means 24, and 31 is a OR gate circuit which performs control so that the mode control means 30 does not operate if any one of the hand setting warning signal, charge warning signal, and stoppage warning signal is output.

Elements such as the above-noted selector means 20, counter control means 22, mode control means are formed as part the microcomputer 100.

In the present invention, the control section management means 400 is formed by the stoppage warning signal output means 29.

The reference numeral 32 denote an oscillation detection circuit, which outputs an oscillation detection signal when the oscillator circuit 1 is oscillating, and 33 is a microcomputer reset means, which in the condition in which the stoppage warning signal is being output, if it receives either the oscillation detection signal output by the oscillation detection circuit 32 or the writing completed signal from the counter control means 22, outputs a microcomputer reset signal.

Within the above-described configuration, the watch circuit 200 is formed by, for example, the oscillator circuit 100 and the microcomputer 100.

Figure 2:
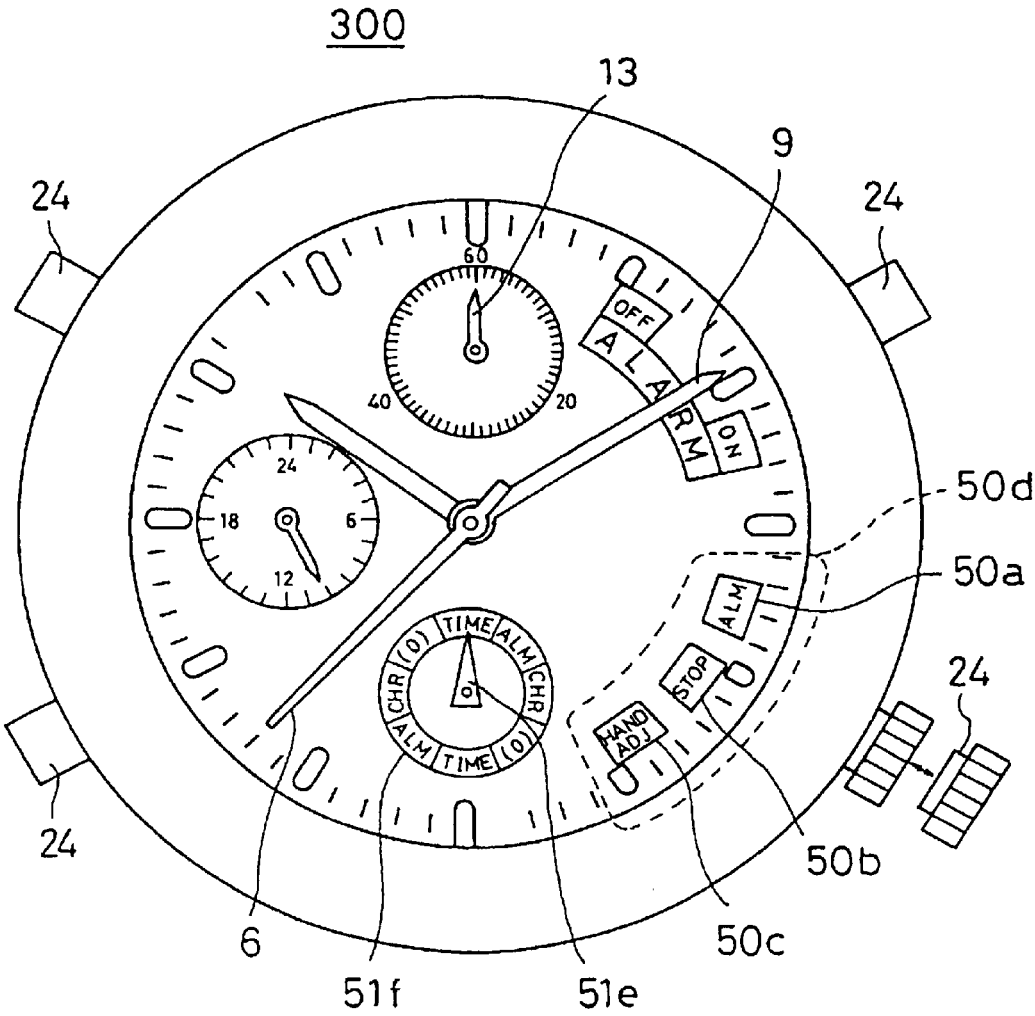
FIG. 2 is an outer view of a multifunction electronic watch having an electrical generation mechanism according to the present invention.

Next, the operation of an embodiment of the present invention will be described, with reference being made to FIG. 1 and FIG. 2 is an outer view of a multifunction electronic watch having an electrical generation mechanism according to the present invention.

In FIG. 2, the reference numeral 50d denotes a condition indicating section which indicates the condition of the electronic watch 300, this condition indicating section 50d comprising an warning mark 50a which indicates the charge warning state, a stop mark 50b which indicates the stopped state, and the hand setting mark 50c which indicates the hand setting state.

The reference numeral 51f denotes a mode indicating section, the mode mark of which that is currently being pointed to by the mode hand 51e being the current mode. In FIG. 2, "TIME" is being pointed to, indicating that the current mode is the normal time mode.

In an electronic watch 300 according to the present invention, while it is necessary to at first cause the second hand 6 and the chronograph 13 to coincide with a reference position, this will not be described, since it is done by mean of known technology.

The case in which the voltage decreases is described below.

The electronic watch 300 operates as a normal multifunction watch at a electrical generation means 26 voltage down to 1.27 V. When the voltage of the electrical generation means 26 reaches 1.27 V, the voltage detection means 27 outputs the first detection signal S1, causing the charge warning signal output means 28 to output the charge warning signal JS.

As a result, the selector means 20 switches the output from the second counter to the 18 counter 19 contents. This results in the second hand 6 stopping at the "warning" mark at the 18-second position, thereby indicating the charge warning state. This is to inform the user that the amount of electrical energy in the electrical generation means 26 is insufficient, thereby prompting the user to perform charging.

Additionally, because the charge warning signal JS is output to the mode control circuit 30 via the OR gate circuit 31, the mode control circuit 30 controls the waveform-shaping circuit 3 so as to forcibly hold the electronic watch 300 in the time mode.

If the voltage of the electrical generation means 26 decreases further to 1.20 V, the voltage detection means 27 outputs the second detection signal S2.

However, even if it receives this second detection signal S2, the stoppage warning signal output means 29 does not operate. If the voltage of the electrical generation means 26 further decreases to 1.15 V, the voltage detection means 27 outputs the third detection signal S3. The stoppage warning signal output means 29, upon receiving this third detection signal S3, outputs the stoppage warning signal TS. As a result, the selector means 20 switches the output from the 18 counter 19 to the 21 counter 17.

The result of this is that the position of the second hand 6 moves so that it stops at the "STOP" mark 50b in FIG. 2, and the watch goes into the stoppage warning state.

This is the state in which the user is notified that the electronic watch 300 is in the stopped state. Additionally, because by means of this stoppage warning signal TS the hour/minute hand control means 50 is not longer able to operate, the hour/minute hand 9 stops.

Next, when the stoppage warning signal TS is received and the second-hand position counter 10 count value reaches 21, the counter control circuit 22 writes the contents of the second-hand position counter 10 and the chronograph hand position counter 14 into the non-volatile memory 23.

When the writing of these contents is completed, a writing complete signal is output to the microcomputer reset means 33. The microcomputer reset means 33 receives this writing complete signal and outputs a reset signal. This places the microcomputer in the reset condition.

If the voltage stops, the oscillation of the oscillator circuit 1 also stops, so that the watch circuit 200, which includes the microcomputer 100, completely stops.

Turning now to a description of the case in which the voltage of the electrical generation means 26 increases, when the voltage of the electrical generation means 26 is 0 V, all constitutional elements shown in FIG. 1 stop. Thereafter, if, for example, incident light is received, so that the voltage of the electrical generation means 26 exceeds some value (normally approximately 0.75 V), the oscillator circuit 1 begins to oscillate. When this occurs, the oscillation detection circuit 32 outputs the oscillation detection signal.

This signal is received at the microcomputer reset means 33, which thereupon outputs a microcomputer reset signal. This places the microcomputer in the reset condition. Elements other than the microcomputer 100, such as the stoppage warning signal output means 29 are reset and initialized by means of a power-on reset circuit (not shown in the drawing). The voltage detection means 27 also begins to operate. Because the voltage value of the electrical generation means 26 is lower than 1.15 V, all first detection signal S1, second detection signal S2, and third detection signal S3 are all output.

If the voltage of the electrical generation means 26 further increases so that it exceeds 1.15 V, the voltage detection means 27 cancels the third detection signal S3 that is being output to the stoppage warning signal output means 29.

However, the stoppage warning signal output means 29 continues to output the stoppage warning signal TS. For this reason, the hour/minute hand control means 50 does not pass the pulse from the waveform-shaping circuit 3, so that the hour/minute hand 9 remains in the stopped condition. Because the microcomputer also remains in the reset condition, the second hand 6 remains stopped at the STOP mark 50b.

If the voltage of the electrical generation means 26 increases further, so that it exceeds 1.2 V, the voltage detection means 27 cancels the second detection signal S2, at which point the stoppage warning signal output means 29 cancels the stoppage warning signal TS.

When the stoppage warning signal is canceled, the microcomputer control means 33 is controlled so that the reset condition of the microcomputer 100 is canceled. The result of this is that the microcomputer starts to operate.

The hour/minute hand control means 50 now passes the step pulse from the waveform-shaping circuit 3, so that the hour/minute hand 9 starts to operate. Next, the counter control means 22 starts to operate by reading out the contents of the second-hand position counter 10 and the chronograph hand position counter 14 from the non-volatile memory 23, these contents being transferred to the respective counters.

In addition, the counter control means 22 outputs a readout completed signal to the coincidence detection circuit 21, for the purpose of ending the readout operation. Because the microcomputer 100 has already been reset, the hand setting warning signal output means 25 and the charge warning signal output means 28 are at this point outputting the signals HS and JS, respectively.

Therefore, at the selector means 20, the hand setting warning signal HS input at the C2 terminal has priority and the contents of the 24 counter 18 are output. The coincidence detection circuit 21 controls the waveform-shaping circuit 3 until the contents of the 24 counter 18 and the contents of the second-hand position counter 10 coincide.

Therefore, the second hand 6 is stopped at the 24-second position, which is the "HAND SETTING" mark 50c. That is, the electronic watch is in the hand-setting state.

This is a mode which the user is warned that the watch has completed stopped, and that the minute and hour hands indicate a time that is different than the correct time.

If at this point the user operates the switch means 24 to set the minute/hour hand 9 to the correct time, the hand setting warning signal output means 25 inputs an operating signal from the switch means 24 and cancels the output of the hand setting alarm signal HS.

The result is that the selector means 20 outputs the contents of the 18 counter 19, this further resulting in the second hand 6 stopping at the 18-second position, which is the "warning" mark 50a. At this point, during the period in which the OR gate circuit 31 is outputting either the hand setting alarm signal HS or the charge warning signal JS, the mode control means 30 is controlled, so that the electronic watch 300 is held in the time mode.

If the voltage of the electrical generation means 26 increases further so that it exceeds 1.27 V, the voltage detection means 27 cancels the first detection signal S1. However, even if the first detection signal S1 is canceled, the charge warning signal output means 28 continues to output the charge warning signal JS until that condition is maintained continuously for 30 minutes.

Then, if the cancellation of the first detection signal S1 is detected continuously for 30 minutes, the charge warning signal JS is canceled. When this occurs, the selector means 20 outputs the second counter 16, resulting in the second-hand position counter 10 coinciding with the second counter 16. This causes the second hand 6 to indicate the second of the current time, and to start to step in one-second intervals.

The mode control means 30 also goes into the operating condition, so that by operating the switch means 24 it is possible to change the electronic watch 300 to a different mode, such as the chronograph mode.

The actual transition of the mode is performed by causing the second-hand position counter 10 to coincide with the chronograph counter (not shown in the drawing), but since this is not directly related to the present invention, this will not be described in further detail.

If the voltage of the electrical generation means 26 further increases so that it becomes 2.6 V, a limiter circuit (not shown in the drawing) operates to control the voltage so that it does not exceed 2.6 V. This action enables operation as a normal multifunction electronic watch when the voltage of the electrical generation means 26 is in the range 1.27 V to 2.6 V.

The state transitions in the electronic watch 300 according to the present invention will be described in further detail, with reference being made to FIG. 2 and FIG. 5.

Figure 5:
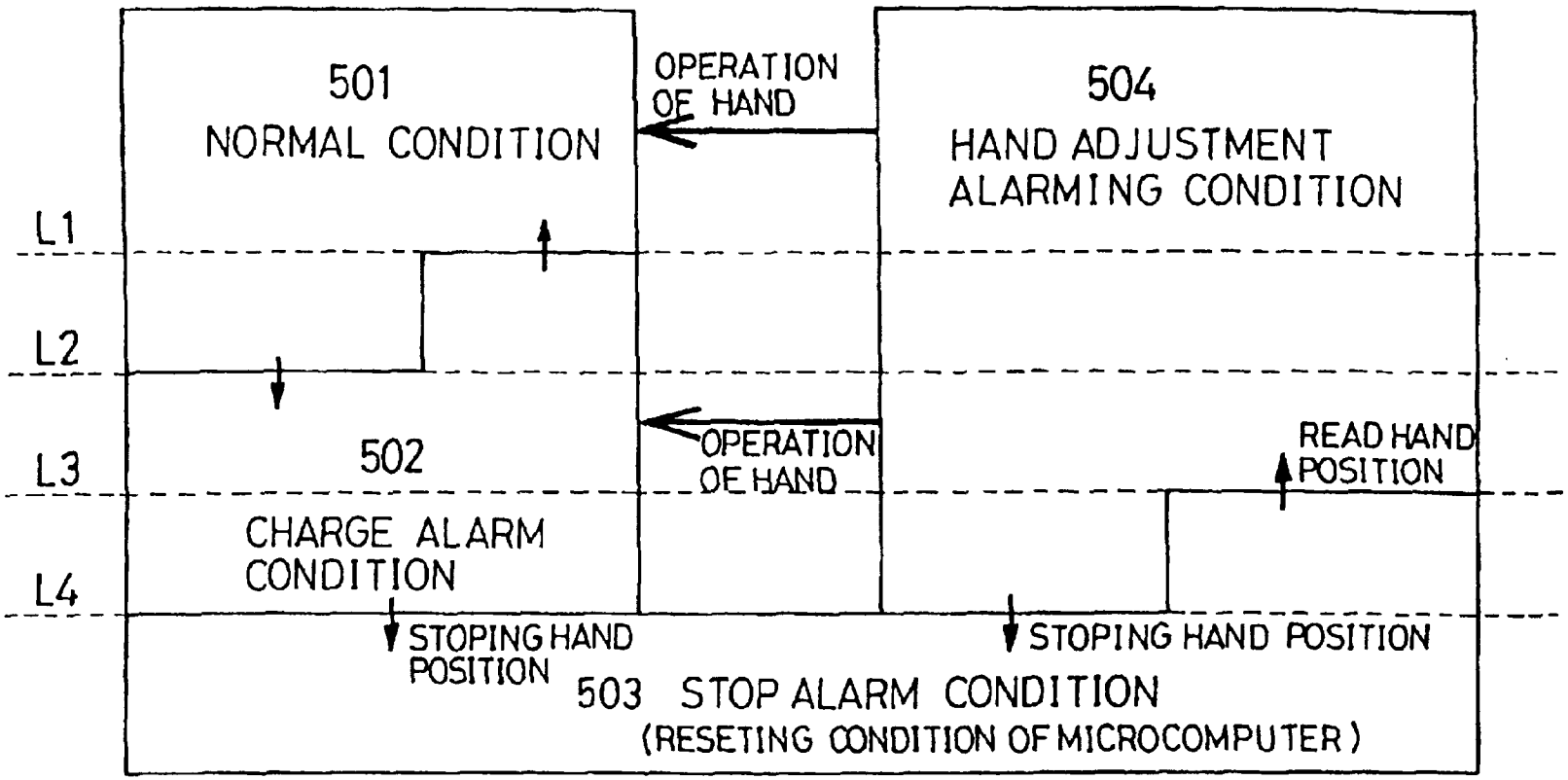
FIG. 5 shows a chart showing relationship among several state-transitions to be considered in the present invention.

In FIG. 5, the reference numeral 501 denotes the normal state, 502 is the charge warning state, 503 is the stoppage warning state, and 504 is the hand setting warning state. In this drawing, the lines L1 through L4 represent the voltage condition of the electrical generation means 26, L1 being the line when the voltage of 1.27 V is continuously detected for 30 minutes, L2 being the 1.27-V line, L3 being the 1.20-V line, and L4 being the 1.15-V line.

The various state transitions are described below.

(1) Transition from the normal state 501 to the charge warning state 502

In the normal state 501, it is possible to use not only the current time display function of the electronic watch 300, but also such other functions as the chronograph function thereof. If in this condition the voltage of the electrical generation means 26 decreases so that it reaches 1.27 V, the electronic watch goes into the charge warning state. In this state, the mode of the electronic watch 300 is fixed as the current time display mode, and only the minute/hour hand 9 is driven. The second hand 6 stops at the "warning" mark 50a which is shown in FIG. 2. This state informs so as to prompt the user to perform charging.

(2) Transition from the charge warning state 502 to the normal state 501

In the charge warning state 502, if the user performs charging of the electrical generation means 26 (application of light when the electric generation mechanism is optical, or movement of the electronic watch 300 if the electrical generation mechanism is mechanical), so that the voltage thereof is 1.27 for 30 minutes, the electronic watch 300 goes into the normal state 501.

(3) Transition from the charge warning state to the stoppage warning state 503

If in the charge warning state the voltage of the electrical generation means 26 further decreases so that it reaches 1.15 V, the electronic watch 300 goes into the stoppage warning state 503. In this state, the second hand 6 is stopped at the position of the "STOP" mark which is shown in FIG. 2, and the microcomputer is in the reset condition, so that the minute/hour hand 9 is stopped.

(4) Transition from the stoppage warning state 503 to the hand setting warning state 504

In the stoppage warning state 503, if the user performs charging of the electrical generation means 26 so that the voltage thereof exceeds 1.20 V, the microcomputer 100 begins to operate, and the electronic watch 300 transitions into the hand setting warning state 504. In this state, the second hand 6 is stopped at the HAND SETTING mark which is shown in FIG. 2, to notify the user that it is necessary to correct the time of the minute/hour hand 9, which has been disturbed.

(5) Transition from the hand setting warning state 504 to the stoppage warning state 503

In the hand setting warning state 504, if the voltage of the electrical generation means 26 falls to 1.15 V, transition is made to the stoppage warning state 503, and the second hand 6 stops at the STOP mark 50b which is shown in FIG. 2.

(6) Transition from the hand setting warning state 504 to the charge warning state 502

In the hand setting warning state 504, when hand setting is performed by operating the input means 24, transition is made to the charge warning state 502. When this occurs, the second hand 6 stops at the WARNING mark which is shown in FIG. 2, and the minute/hour hand 9 begins to indicate the current time.

(7) Transition from the hand setting warning state 504 to the normal state 501

In the hand setting warning state, if the user does not perform hand setting, even the voltage of the electrical generation means 26 increase so that the value of voltage is detected as being 1.27 V for 30 minutes continuously, as long as the user does not operate the switch means 24 to perform time correction, the hand setting warning state 504 will be maintained. In this case, however, when time correction is performed, transition is made to the normal state.

As described above, whereas the transition from the normal state 501 to the charge warning state 502 is made when the voltage value of the electrical generation means 26 becomes 1.27 V, the transition from the charge warning state 502 to the normal state 501 is only made when the voltage value of the electrical generation means 26 is detected as having reached 1.27 V for 30 minutes.

By providing this temporal hysteresis between these two state transitions, frequent state transitions are prevented in the case in which the voltage of the electrical generation means 26 varies in the region of 1.27 V.

Additionally, whereas the transition from the charge warning state 502 to the stoppage warning state 503 is made when the voltage value of the electrical generation means 26 becomes 1.15 V, the transition from the stoppage warning state 503 (via the hand setting warning state 504) is made when the voltage value of the electrical generation means 26 becomes 1.2 V, thereby providing voltage hysteresis between these two states and making it possible to eliminate state transitions and prevent unnecessary hand position storage operations when the voltage value of the electrical generation means 26 varies between 1.15 and 1.2 V.

Although the above is a description of the state transitions in an electronic watch according to the present invention, the present invention is not limited in this manner, and it is possible to provide either temporal hysteresis and voltage hysteresis between any state transition.

A different aspect of the present invention is an electronic watch comprising an electrical generation means, an electrical power storage means which storage energy generated by the above-noted electrical generation means, an oscillator circuit, a control section which operates in response to a clock from the above-noted oscillator circuit, and a display section which is controlled by the above-noted control section, and which displays the time and also selectively displays a function other than the time display, this electronic watch being provided with a voltage detection means, having a first mode in which the above-noted function other than the time display operates based on the voltage of this voltage detection means, and a second mode in which, based on the voltage of the voltage detection means the above-noted function other than the time display does not operate, hysteresis being provided between the point of transition from mode 1 to mode 2 and the point of transition from mode 2 to mode 1.

Figure 3:
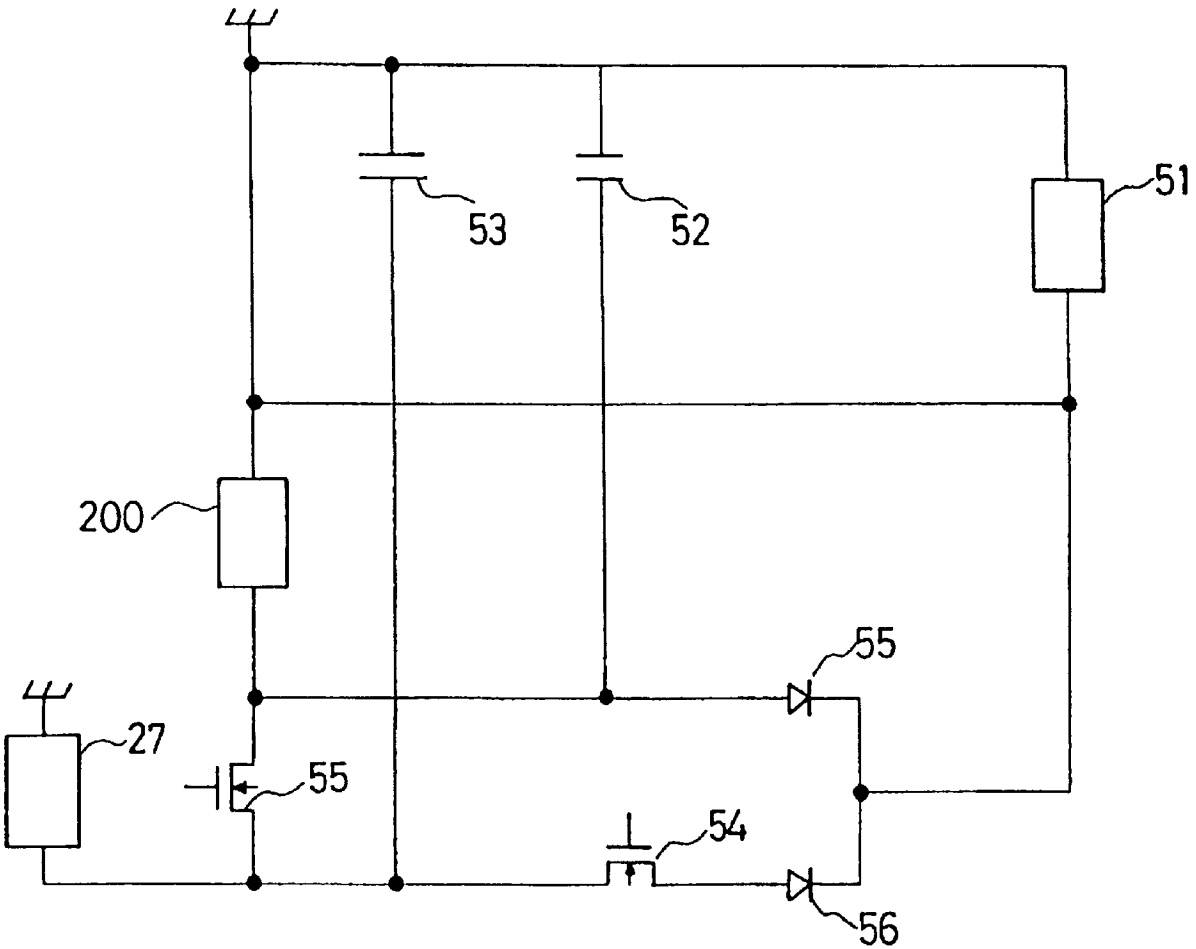
FIG. 3 is a circuit block diagram of an electrical generation means of a multifunction electronic watch having an electrical generation mechanism according to the present invention.

Next, a specific configuration of the electrical generation means 26 will be described, using FIG. 3.

In this drawing, reference numeral 51 denotes an electric power generator means, which can be, for example a solar cell, in which case it would generate electrical energy in response to received light, 52 is a small-capacitance capacitor, which is an electrical power storage means for the purpose of quickly operating the watch circuit 200 which is shown in FIG. 1, and 53 is a secondary cell, which is used in along with the small-capacitance capacitor 52 to store electrical energy that is generated by the solar cell or other type of electric power generator means 51.

The reference numerals 55 and 56 denote reverse-current preventing diodes which prevent leakage of a charge which is stored in the small-capacitance capacitor 52 and in the secondary cell 53 via the solar cell 51, and 54 is a time-division switch, which is configured by an NPN-type MOS transistor.

The time-division switch 54 is provided to receive a prescribed clock from the oscillator circuit 2 and alternately charge the small-capacitance capacitor 52 and the secondary cell 53. The reference numeral 55' is a capacitively coupled switch, which is configured by an NPN-type MOS transistor. The capacitively coupled switch 55' is controlled by the above-described stoppage warning signal, so that it switches to on when the stoppage warning signal is canceled.

In addition to the solar cell used in the descriptions above, the electric power generator means 51 used in the present invention can be a mechanical electrical generating means which makes used of the movement of the arm, for example, to generate electrical energy. Additionally, both of the electrical power storage means 52 and 53 are not absolutely necessary, it being possible to use a capacitor or a plurality thereof only or to use only a secondary cell alone.

The operation of the electrical generation means 26 will be described below, with reference being made to FIG. 3.

Assume first that there is amount of stored energy in the small-capacitance capacitor 52 and the secondary cell 53 is zero, and that light is not being received. In this condition, if light strikes the solar cell 51, an electrical voltage will be generated. Because the time division switch 54 is off at this point, the generated voltage is stored in the small-capacitance capacitor 52. Because the small-capacitance capacitor 52 has a small capacitance, it is charged quickly, this being used as electrical energy to start operation of the watch circuit.

First, the oscillator circuit 1 begins to oscillate, a clock which is derived by frequency dividing the oscillation signal thereof controlling the time division switch 54 so as to charge the small-capacitance capacitor 52 and the secondary cell 53 alternately. However, because the voltage of the secondary cell 53 does not increase immediately, the watch circuit operates for a while from the small-capacitance capacitor 52.

Figure 4:
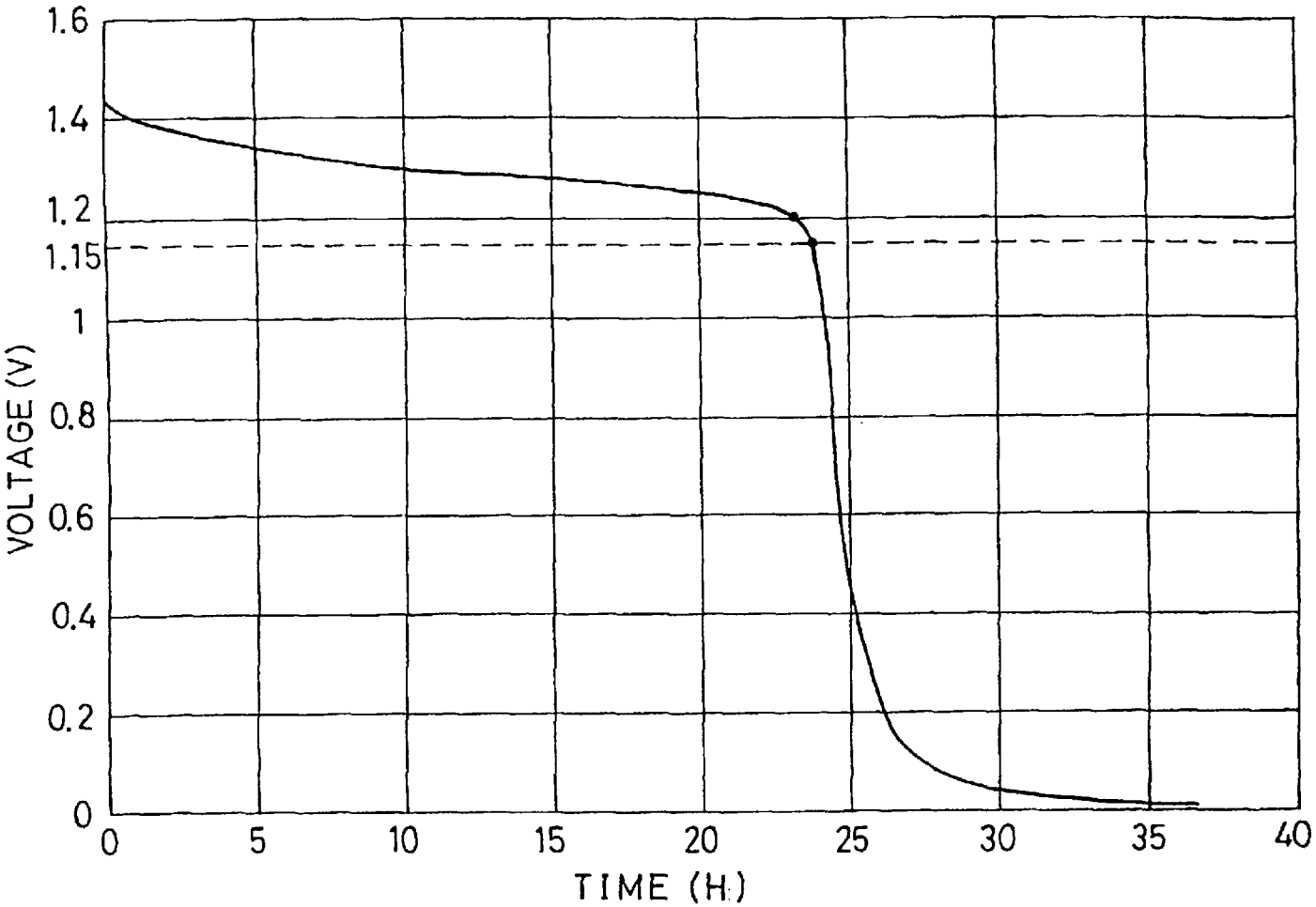
FIG. 4 is a drawing which shows the discharge characteristics of a secondary cell with relation to the present invention.

Next, the characteristics of the secondary cell 53 used as the electrical power storage means 53 in this embodiment will be described, using FIG. 4. FIG. 4 shows the discharge characteristics of a titanium lithium ion secondary cell used in this embodiment. Because this secondary cell is not only compact, and also because compared to a large-capacitance capacitor that was used in the past, the amount of storage is very large, it is suitable for use as an electrical generation means in an electronic watch having a electrical generation mechanism.

However, as shown in FIG. 4, when the amount of charge in this titanium lithium ion secondary cell decreases, it exhibits a sharp decrease in voltage in the 1.2 V region. To be able to use a charged secondary cell for as long as possible, then, it is desirable to stop the operation of the microcomputer in the region of 1.15 V.

Doing this, however, requires the hand position storage operation, which was described earlier, when the voltage of the secondary cell crosses the 1.15 V level. If however, as is done in this embodiment, the voltage at which the microcomputer operation is stopped is set at 1.15 V and the voltage at which the microcomputer operation is started is set at 1.2 V, once the microcomputer is stopped, because the voltage of the secondary cell will be stabilized at the point at which the microcomputer begins operating once again, the above-described problem is prevented.

As described above, the present invention offers a particularly large effect when used with electrical power storage means 53 having characteristics such as those of a titanium lithium ion secondary cell is used in combination with a power supply of type that exhibits voltage increase and voltage decrease, such as a solar cell or a mechanical electrical generation means.

Although in the above embodiment, temporal hysteresis is provided at the switching point between the normal state and the charge warning state and voltage hysteresis is provided at the switching point between the charge warning state and the stoppage warning state, the present invention is not limited in this manner, it being possible to achieve the object of the present invention by applying either type of hysteresis at any point.

As described above, in the present invention because hysteresis is provided between the switching point between the normal state and the charge warning state, even using a secondary cell having an unstable supply voltage, it is possible to avoid excessively frequent changes in state, and to avoid confusion on the part of the user. By also providing hysteresis at the switching point between the charge warning state and the stoppage warning state, the frequent resetting and canceling of resetting of the microcomputer are prevented, thereby preventing unnecessary hand position storage operations.

Describing an example of the second aspect of an electronic watch 300 according to the present invention with reference to the above example, as noted in the above example, an electronic watch 300 according to the present invention indicates the current voltage level of the electrical generation means 26 by means of at least one of the plurality of hands used in the time display, such as the minute/hour hand, for example, the second hand 6.

In addition, in the above-noted second aspect of the electronic watch 300 according to the present invention, it is desirable that the control section management section 400 be configured so as to operate the control section 100 in response to a detection signal from the voltage detection means 27, so that at least one hand, such as the second hand 6, of the plurality of hands used for the time display, is caused to stop at a pre-established position for the purpose of displaying the current voltage level of the electrical generation means 26.

That is, in an electronic watch 300 of the second aspect of the present invention, in addition to informing the user as to what type of condition the voltage of the electrical generation means 26 is currently in, the type and relationship of information for the purpose of causing execution of the necessary operation being priorly set, so that in response to the condition the second hand is caused to stop at a pre-established position, making it easy for the user to understand the current condition of the electrical generation means 26 used in the electronic watch 300.

More specifically, a plurality of positions which indicate the current voltage level of the electrical generation means 26 are provide, such as shown as 50a, 50b, and 50c in FIG. 2, and if the above-noted voltage detection means 27 detects a priorly established first voltage value, or example a level of 1.27 V or lower, for the output voltage of the electrical generation means 26, the second hand 6 is stopped at, for example, a first stopping position 50a, if the voltage detection means 27 detects a priorly established second voltage value, for example a level of 1.15, for the output voltage of the electrical generation means 26, the second hand 6 is stopped at, for example, a second stopping position 50b.

Specifically, the above-noted first stopping position is the position which indicates the charge warning state of the electrical generation means, and the above-noted second stopping position is the position which indicates the state in which the timekeeping function of the electronic watch 300 is stopped.

In addition, in the above-noted second aspect of an electronic watch 300 according to the present invention, it is desirable that the above-noted control section management section 400 be configured so as to have an additional third stopping position 50c, to which at least one hand, such as the second hand 6, of the plurality of hands used in the time display, is caused to point by the control section management section 400, in response to a detection signal of the above-noted voltage detection means 27 and an operation of the input operation means 24, the control section 100 so as to control the above-noted hand, thereby indicating that the currently displayed time is not the current accurate time.

In a second aspect of an electronic watch 300 according to the present invention, by virtue of the above-described constitution, it is possible to stop the second hand at a position which indicates the condition of storage of the electrical generation means or the electrical power storage means, thereby informing the user thereof, without having to consume electrical energy unnecessarily.

What is claimed is:

1. In an electronic watch having an electrical power generator means for generating electrical power, an electrical power storage means for storing electrical power generated by said electrical power generating means, an oscillator circuit for producing an output signal, a time-signal generating means for generating a time-signal output in response to the output signal from said oscillator circuit, and a time display which displays time information, responsive to said time-signal output from said time-signal generating means, with a plurality of time indicating hands, an improvement further comprising:

a control section for switching a display of a condition about said electronic watch on said time display;

a voltage detection means for detecting the voltage of said electrical power storage means and for producing an output detection signal; [and]

a control section management means for controlling the operation of said control section in response to the detection signal of the voltage detection means, wherein said control section causes at least one time hand of the plurality of time indicating hands in said time display to move to and to stop at a pre-established position without performing any mechanical operation when the value of said detected voltage drops below a predetermined reference value, during said time display displaying time information, so as to indicate such voltage drop*;*

*wherein when said electronic watch assumes a first status, said control section causes at least one time hand of the plurality of time indicating hands in said time display to move and to stop at a first pre-established stopping position which indicates a charge warning state of said electrical power generator means, and when said electronic watch assumes a second status, said control section causes said at least one time hand to move and to stop at a second pre-established stopping position which indicates that the timekeeping function of said electronic watch is stopped.*

[2. An electronic watch according to claim 1, wherein said control section causes at least one time hand of the plurality of time indicating hands in said time display to move and to stop at a plurality of pre-established positions.]

[3. An electronic watch according to claim 2, wherein when said electric watch assumes a first status, said at least one time hand stops at a first stopping position, and when said electric watch assumes a second status, said at least one time hand stops at a second stopping position.]

[4. An electronic watch according to claim 3, wherein said first stopping position is a position which indicates a charge warning state of said electrical power generator means, and wherein said second stopping position is a position which indicates that the timekeeping function of said electronic watch is stopped.]

5. An electronic watch according to claim [4] *1*, wherein said control section causes at least one time hand of the plurality of time indicating hands in said time display to also move and to stop at a third stopping position which indicates that the minute and hour hands and the time of the timekeeping circuit differ from each other.

6. An electronic watch according to claim 1, wherein said electrical power generator means and said electrical power storage means form an electrical generation means, and wherein said voltage detection means detects an output voltage of said electrical generation means.

7. [In an] *An* electronic watch *comprising:*

[having] an electrical generator means for generating electrical power[,]*;* an electrical power storage means for storing electrical power generated by said electrical power generating means[,]*;*

[an oscillator circuit including a clock for producing an output signal, a control section which operates in response to the clock of said oscillator circuit, and a time display which is controlled by said control section and which displays time and also selectively displays a function other than time, an improvement further comprising a voltage detection means for detecting the voltage of said electrical power storage means, said electronic watch having a first mode in which the function other than time is displayed, based upon a detected voltage value of said voltage detection means, and a second mode in which the function other than time is not displayed, based upon a detected voltage value of said voltage detection means, and a hysteresis is provided between the occurrence of a transition from the first mode to the second mode and the occurrence of a transition from the second mode to the first mode]

*a control means; and*

*a time display which is controlled by said control means and which displays time information and also selectively displays a function other than said time information,*

*an improvement further comprising a voltage detection means for detecting the voltage of said electrical power storage means and for generating an output signal corresponding to said detected voltage,*

*wherein said electronic watch having a first mode in which said time information and said function other than said time information is displayed, based upon a first voltage value detected by said voltage detection means, and a second mode in which only said time information is displayed, based upon said first voltage value detected by said voltage detection means,*

*and further wherein said electronic watch being configured so that said control means switches the electronic watch from said first mode to said second mode in response to the output signal corresponding to said first voltage value of said voltage detection means, and switches the electronic watch from said second mode to said first mode in a case when said output signal corresponding to said first voltage value of said voltage detection means is outputted continuously for a predetermined period of time.*

8. An electronic watch according to claim 7, wherein said electrical power generator means and said electrical power storage means form an electrical generation means, and wherein said voltage detection means detects an output voltage of said electrical generation means.

*9. An electronic watch according to claim 7, wherein said electronic watch further provided with a third mode, and*

*wherein, a transition from said second mode to said third mode is performed at a second voltage being lower than said first voltage, further wherein, a transition from said third mode to another mode other than said third mode is performed at a third voltage which is lower than said first voltage but higher than said second voltage.*

*10. An electronic watch according to claim 7, wherein said electronic watch is further provided with a chronological function as a function other than a current time information display function.*

*11. An electronic watch according to claim 9, wherein said electronic watch is further configured so that in said third mode, said control means performs to display information on a time information display indicating said user a fact that the time display function has been stopped.*

*12. An electronic watch according to claim 9, wherein said electronic watch is further configured so that in response to said third voltage, said control means performs a transition from said third mode to a fourth mode which urges said user of the electronic watch to correct said time information utilizing said time display.*

*13. An electronic watch comprising:*

*a. an electrical power generator for generating electrical power;*

*b. an electrical power storage for storing electrical power generated by said electrical power generator;*

*c. an oscillator circuit for producing an output signal;*

*d. a time signal generator for generating a time signal output in response to the output signal from said oscillator circuit;*

*e. a display, responsive to said time signal output from said time signal generator, for displaying time information with a plurality of time indicating hands;*

*f. voltage detector for detecting a voltage of the electronic watch and for producing an output detection signal based upon said detected voltage value;*

*g. a control section, responsive to the output detection signal of the voltage detector, for causing at least one of the time indicating hands in said time display to stop at a pre-established position in said time display, and which show a condition related to the voltage charge of the electronic watch, when the value of said detected voltage drops below a predetermined reference voltage value;*

*h. wherein when said electronic watch assumes a first status, said control section causes the at least one time indicating hand in said time display to stop at a first stopping position which indicates a charge warning state of said power storage means, and when said electronic watch assumes a second status, said control section causes said at least one time indicating hand to stop at a second stopping position which indicates that the timekeeping function of the electronic watch is in a stopped state.*

*14. An electronic watch according to claim 13, wherein said control section causes said at least one time indicating hand to stop at a third stopping position which indicates that the timekeeping function of the electronic watch has been stopped and that the plurality of time indicating hands can now be reset.*

*15. An electronic watch according to claim 13, wherein said electrical power generator and said electrical power storage form an electrical generation means, and wherein said voltage detector detects an output voltage of said electrical generation means.*

* * * * *